(12) United States Patent
Ichikawa et al.

(10) Patent No.: US 6,408,247 B1
(45) Date of Patent: Jun. 18, 2002

(54) OBSTACLE DETECTING SYSTEM

(75) Inventors: Shoji Ichikawa; Yoichi Sugimoto; Satoshi Hada; Yoshihiro Urai, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/559,744

(22) Filed: Apr. 27, 2000

(30) Foreign Application Priority Data

Apr. 28, 1999 (JP) .......................................... 11-121244

(51) Int. Cl.⁷ .............................. B61L 1/10; B61L 23/06; G08G 1/16
(52) U.S. Cl. .......................... 701/301; 701/96; 701/93; 701/300; 340/901; 340/903
(58) Field of Search ........................... 701/301, 96, 93, 701/300; 340/901, 903

(56) References Cited

U.S. PATENT DOCUMENTS

| | | | | |
|---|---|---|---|---|
| 3,864,678 A | * | 2/1975 | Yamanaka et al. | 342/59 |
| 4,143,370 A | * | 3/1979 | Yamanaka et al. | 343/7 |
| 5,056,031 A | * | 10/1991 | Nakano et al. | 701/301 |
| 5,235,316 A | * | 8/1993 | Qualizza | 340/436 |
| 5,314,037 A | * | 5/1994 | Shaw et al. | 180/169 |
| 5,357,438 A | * | 10/1994 | Davidian | 701/301 |
| 5,388,048 A | * | 2/1995 | Yavnayi et al. | 701/301 |
| 5,515,489 A | * | 5/1996 | Yaeger | 395/173 |
| 5,529,138 A | * | 6/1996 | Shaw et al. | 180/169 |
| 5,572,428 A | * | 11/1996 | Ishida et al. | 701/301 |
| 5,594,414 A | * | 1/1997 | Namngani | 340/436 |
| 5,642,093 A | * | 6/1997 | Kinoshita et al. | 340/439 |
| 5,680,117 A | * | 10/1997 | Arai et al. | 340/903 |
| 5,699,040 A | * | 12/1997 | Matsuda | 340/435 |
| 5,741,214 A | * | 4/1998 | Ouchi et al. | 600/374 |
| 5,754,099 A | * | 5/1998 | Nishimura et al. | 340/435 |
| 5,818,355 A | * | 10/1998 | Shirai et al. | 340/903 |
| 5,841,367 A | * | 11/1998 | Giovanni | 340/903 |
| 5,878,361 A | * | 3/1999 | Sekine et al. | 701/41 |
| 5,889,476 A | * | 3/1999 | Schmitz | 340/903 |
| 5,931,547 A | * | 8/1999 | Ierner | 303/193 |
| 6,114,951 A | * | 9/2000 | Kinoshita et al. | 340/436 |
| 6,223,125 B1 | * | 4/2001 | Hall | 701/301 |
| 6,226,389 B1 | * | 5/2001 | Lemelson et al. | 382/104 |
| 6,246,932 B1 | * | 6/2001 | Kageyama et al. | 701/24 |
| 6,269,307 B1 | * | 7/2001 | Shinmura et al. | 701/301 |

FOREIGN PATENT DOCUMENTS

JP            11-23705            1/1999

* cited by examiner

Primary Examiner—William A. Cuchlinski, Jr.
Assistant Examiner—Olga Hernandez
(74) Attorney, Agent, or Firm—Arent Fox Kintner Plotkin & Kahn, PLLC

(57) ABSTRACT

The accuracy of determination of a possibility of collision of a vehicle with an object is enhanced without the shortening of a period for detection of the object by an object detecting apparatus. A collision-possibility determining device determines the presence or absence of a possibility of collision of the vehicle with the obstacle by comparing a future locus of movement of the obstacle determined by an obstacle locus determining device based on an output from a radar device, with a future locus of movement of the vehicle determined by a vehicle locus determining apparatus based on outputs from wheel speed sensors and a yaw rate sensor. The period of the detection conducted by the radar device providing data about the obstacle to the obstacle locus determining apparatus is 100 msec, but the obstacle locus determining apparatus, the vehicle locus determining apparatus and the collision-possibility determining apparatus carry out the determination of the possibility of collision at a determination period shorter than the detection period of 100 msec. Thus, it is possible to carry out the determination of the possibility of collision at the shorter determination period without use of a large-sized and expensive radar device, thereby enhancing the determination accuracy.

5 Claims, 7 Drawing Sheets

FIG.5
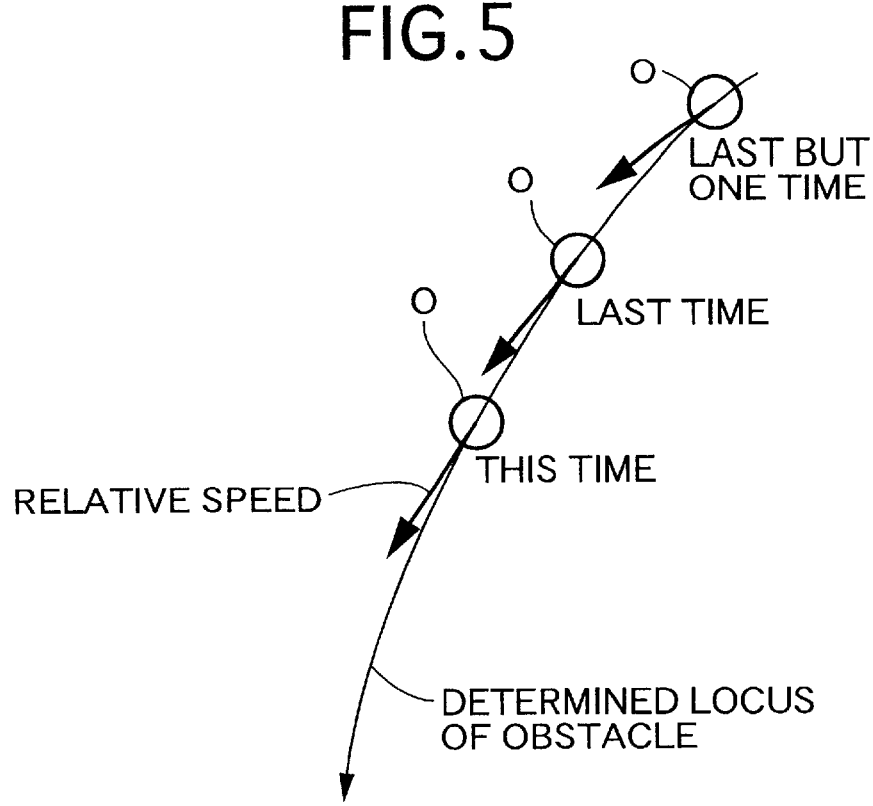
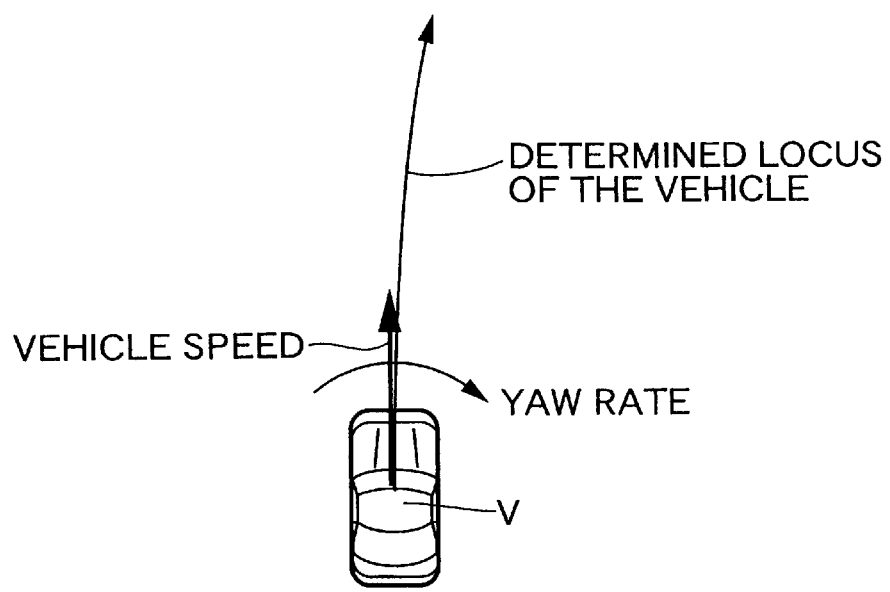

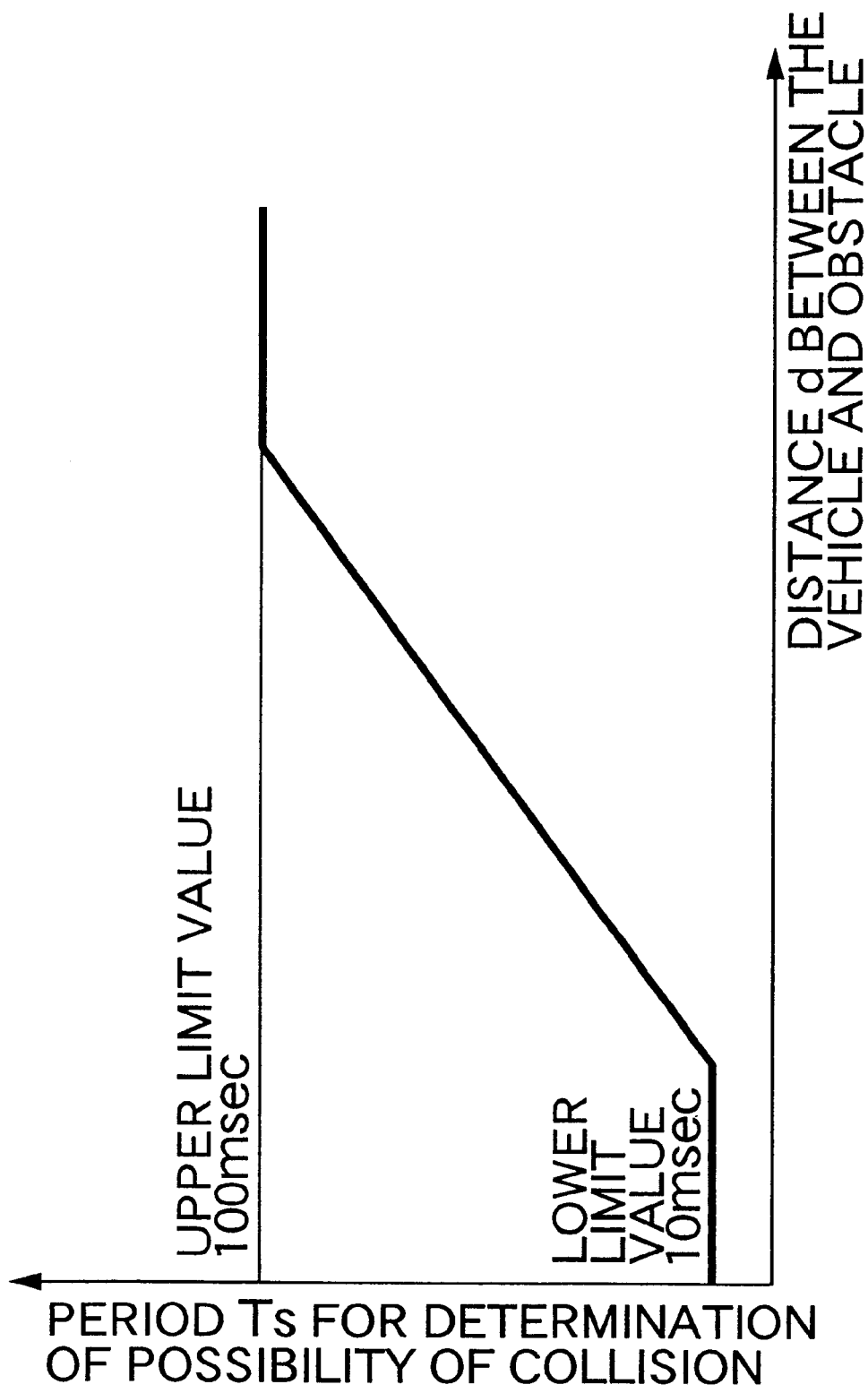

OBSTACLE DETECTING SYSTEM

BACKGROUND OF THE INVENTION

1. Field of the Invention

The present invention relates to an obstacle detecting system for detecting an object ahead of a moving body in the direction of movement of the moving body. The object is detected by an object detecting means such as a radar device provided on the moving body. The possibility of collision of the moving body with the object is determined, based on the result of the detection.

2. Description of the Prior Art

An obstacle detecting system is conventionally known from Japanese Patent Application Laid-open No. 11-23705, which is designed, so that an obstacle ahead of a vehicle is detected by a radar device which comprises an electromagnetic wave transmitting means for transmitting electromagnetic waves comprising laser beams or millimeter waves, ahead of the vehicle, and an electromagnetic wave receiving means for receiving the reflected waves resulting from the reflection of the electromagnetic waves from the object. When there is a possibility of a collision of the vehicle with the obstacle, a warning is provided to a driver, or automatic braking is carried out.

In such an obstacle detecting system, it is necessary to detect the obstacle in a detection area within a range of predetermined angles ahead of the vehicle and for this reason, the detection area is scanned laterally and longitudinally by the electromagnetic waves transmitted from the electromagnetic wave transmitting means of the radar device. Therefore, the obstacle is detected intermittently at intervals, wherein the interval period corresponds to a time taken for scanning the entire detection area one time by the electromagnetic wave.

To prevent the execution of the warning and the execution of the automatic braking which are not necessarily required for avoiding the collision, thereby reducing the sense of incompatibility provided to the driver, the following problem is encountered: It is necessary to detect the obstacle at an interval or period as short as possible to determine the presence or absence of the possibility of collision accurately, but a radar device having a short detection period is increased in size and is expensive.

SUMMARY OF THE INVENTION

The present invention has been accomplished with the above circumstance in view, and it is an object of the present invention to enhance the accuracy of determination of the possibility of a collision of the vehicle with the object, without shortening the interval or period for detection of the object by the object detecting means.

To achieve the above object, there is provided an obstacle detecting system comprising an object detecting means for detecting an object present in the direction of movement of a moving body, a speed detecting means for detecting the speed of movement of the moving body, and a collision-possibility determining means for determining a possibility of collision of the moving body with the object, based on the result of the detection by the object detecting means and the result of the detection by the speed detecting means. The determination period for determination of the possibility of collision by the collision-possibility determining means, is set to be shorter than the detection period for the detection of the object by the object detecting means.

With the above arrangement, the determination period for determination of the possibility of a collision by the collision-possibility determining means is set to be shorter than the detection period for detection of the object by the object detecting means. Therefore, it is possible to carry out the determination of the possibility of a collision at the short determination period without the use of a large-size and expensive object detecting means having a short detection period, thereby enhancing the determination accuracy.

In addition, the collision-possibility determining means detects the position of the object relative to the moving body based on the detection by the object detecting means and the detection by the speed detecting means to determine the possibility of collision based on the change in relative position. The relative position is detected at a period shorter than the detection period for the detection of the object by the object detecting means.

With the above arrangement, the change in position of the object relative to the moving body, is detected at a period shorter than the detection period for detection of the object by the object detecting means, and hence, the collision-possibility determining means can determine the possibility of collision accurately, based on the change in relative position.

Further, the determination period for the determination of the possibility of collision by the collision-possibility determining means becomes shorter, as the distance between the moving body and the object becomes shorter.

With the above arrangement, the determination period for the determination of the possibility of collision becomes shorter, as the distance between the moving body and the object becomes less. Therefore, when there is a high possibility of collision, the determination period can be shortened to enhance the determination accuracy.

The determination period for the determination of the possibility of collision by the collision-possibility determining means is shorter, as the relative speed between the moving body and the object becomes higher.

With the above arrangement, the determination period for the determination of the possibility of collision by the collision-possibility determining means becomes shorter, as the relative speed between the moving body and the object becomes higher. Therefore, when there is a high possibility of collision, the determination period can be shortened to enhance the determination accuracy.

The determination period for the determination of the possibility of collision by the collision-possibility determining means becomes shorter, as the lateral relative position of the object becomes closer to the moving body.

With the above arrangement, the determination period for the determination of the possibility of collision by the collision-possibility determining means becomes shorter, as the lateral relative position of the object becomes closer to the moving body. Therefore, when there is a high possibility of collision, the determination period can be shortened to enhance the determination accuracy.

BRIEF DESCRIPTION OF THE DRAWINGS

The mode for carrying out the present invention will now be described by way of an embodiment shown in the accompanying drawings.

FIGS. 1 to 7 show an embodiment of the present invention.

FIG. 1 is an illustration of the entire arrangement of a vehicle including an obstacle detecting system according to the embodiment of the present invention.

FIG. 2 is a block diagram of a control section thereof.

FIG. 3 is a block diagram for explaining the circuit arrangement of an electronic control unit.

FIG. 4 is a flow chart for explaining the operation.

FIG. 5 is an illustration for explaining the determination of loci of movements of a vehicle and an obstacle.

FIG. 7 is a graph showing the relationship between the distance between the vehicle and the obstacle and the period of determination of a collision possibility.

DETAILED DESCRIPTION OF THE PREFERRED EMBODIMENT

Figure 1:
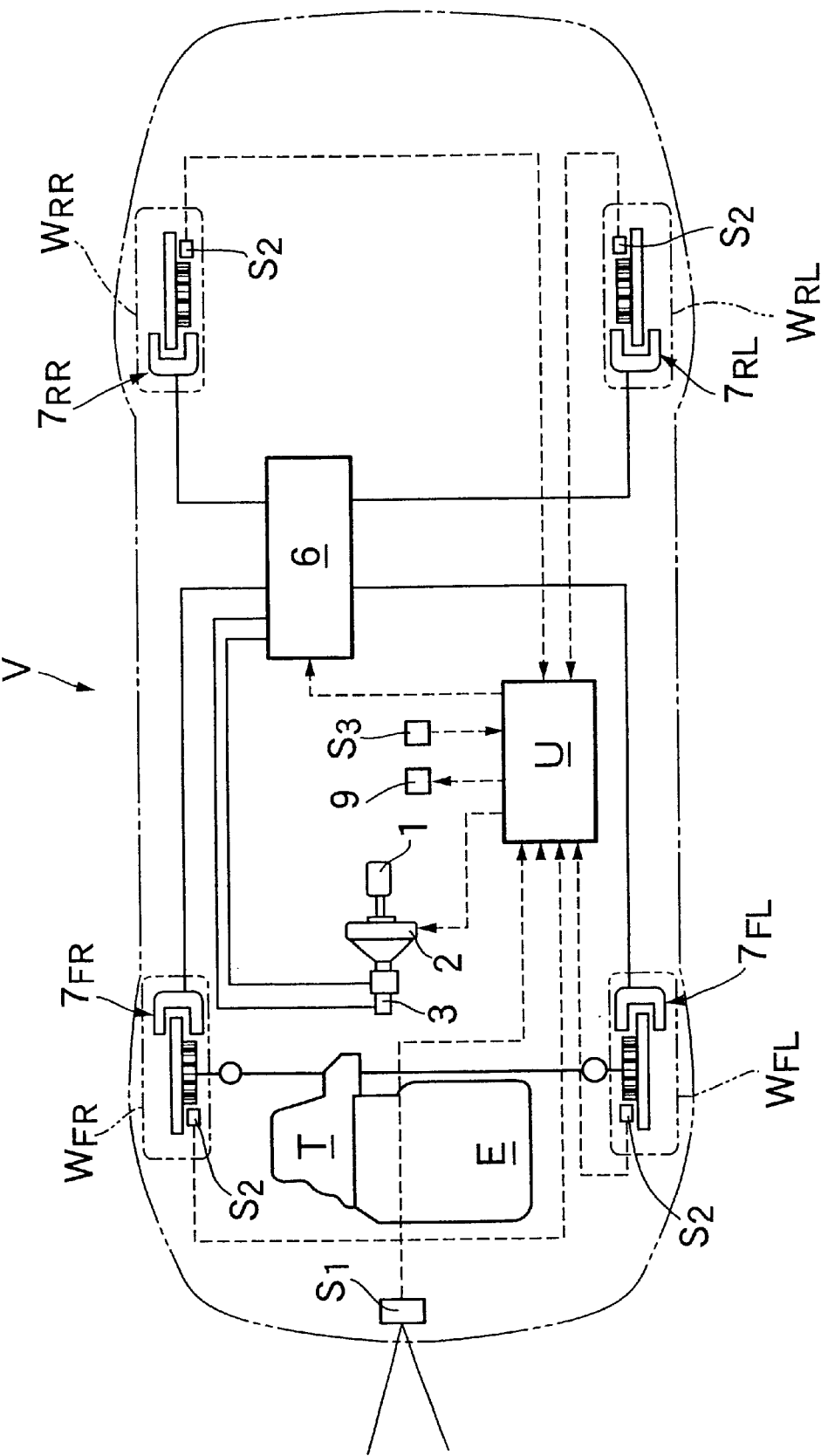
Figure 2:
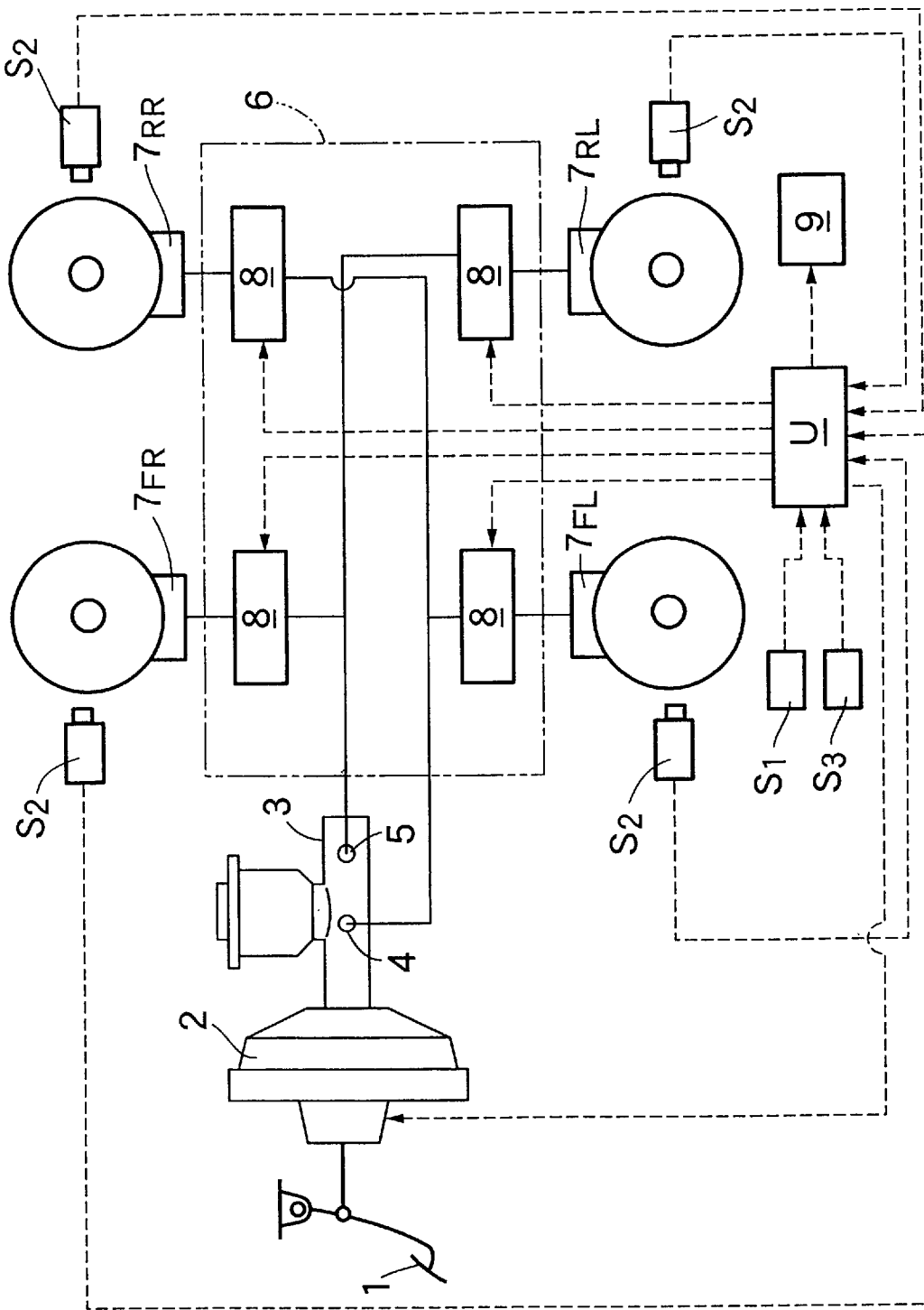

As shown in FIGS. 1 and 2, a four-wheel vehicle V equipped with an obstacle detecting system according to the present invention includes left and right front wheels $W_{FL}$ and $W_{FR}$ which are driving wheels to which a driving force from an engine E is transmitted through a transmission T, and left and right rear wheels $W_{RL}$ and $W_{RR}$ which are follower wheels rotated with the traveling of the vehicle V. A brake pedal 1 operated by a driver is connected through an electronically-controlled vacuum booster 2 to a master cylinder 3. The electronically-controlled vacuum booster 2 mechanically boosts the depression force applied to the brake pedal 1 to operate the master cylinder 3. It also operates the master cylinder 3 by a braking command signal from an electronic control unit U without recourse to the operation of the brake pedal 1 during an automatic braking operation. When a depression force has been applied to the brake pedal 1 and the braking command signal has been input to the electronically-controlled vacuum booster 2 from the electronic control unit U, the electronically-controlled vacuum booster 2 outputs a hydraulic braking pressure in accordance with the larger of the depression force and the braking command signal. The electronically-controlled vacuum booster 2 has an input rod which is connected to the brake pedal 1 through a lost motion mechanism, so that even if the electronically-controlled vacuum booster 2 is operated by the signal from the electronic control unit U, whereby the input rod is moved forwards, the brake pedal 1 remains at an initial position.

A pair of output ports 4 and 5 provided in the master cylinder 3 are connected to brake calipers $7_{FL}$, $7_{FR}$, $7_{RL}$ and $7_{RR}$ mounted respectively on the front wheels $W_{FL}$ and $W_{FR}$ and the rear wheels $W_{RL}$ and $W_{RR}$ through a hydraulic pressure control device 6. The hydraulic pressure control device 6 includes four pressure regulators 8 which correspond to the four brake calipers $7_{FL}$, $7_{FR}$, $7_{RL}$ and $7_{RR}$, so that a hydraulic braking pressure generated by the master cylinder 3 is transmitted through the pressure regulators 8 to the brake calipers $7_{FL}$, $7_{FR}$, $7_{RL}$ and $7_{RR}$.

Figure 3:
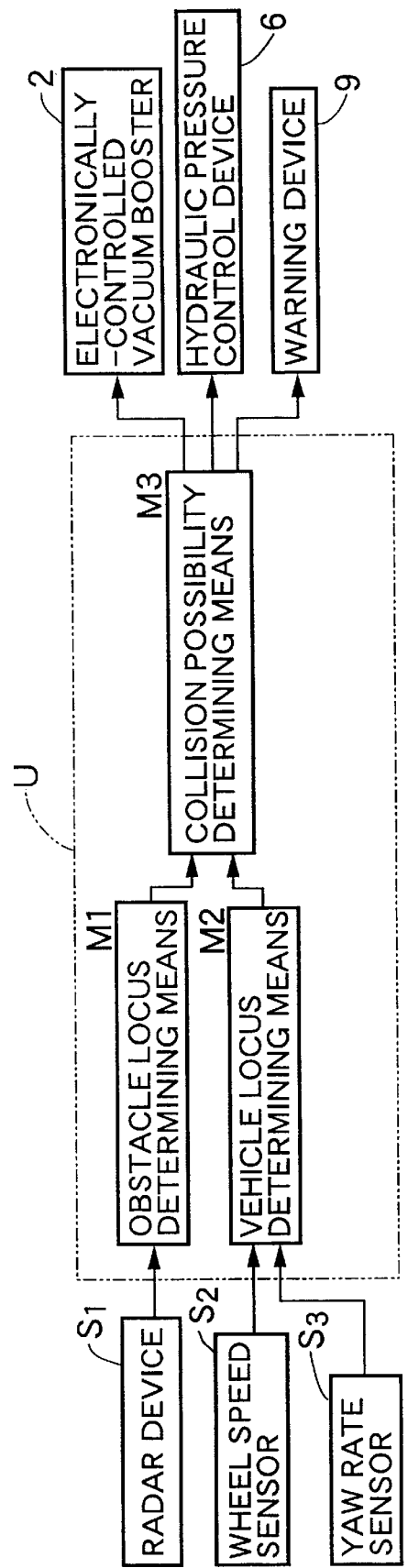

As can be seen from FIG. 3, the electronic control unit U includes an obstacle locus determining means M1, a vehicle locus determining means M2, and a collision possibility determining means M3. Connected to the obstacle locus determining means M1 is a radar device $S_1$ for transmitting laser beams or millimeter waves forwards of a vehicle body to detect the relative position and the relative speed of an obstacle O (see FIG. 5), such as an on-coming vehicle relative to the vehicle, based on a reflected wave resulting from the reflection of the laser beams or millimeter waves. Connected to the vehicle locus determining means M2 are wheel speed sensors $S_2$ for detecting the rotational speeds of the front wheels $W_{FL}$ and $W_{FR}$ and the rear wheels $W_{RL}$ and $W_{RR}$, respectively, and a yaw rate sensor $S_3$ for detecting the yaw rate of the vehicle. The radar device $S_1$ scans a detection area ahead of the vehicle body, for example, at a detection period of 100 msec by the laser beams or the millimeter wave and hence, information about the obstacle O is obtained at every detection period of 100 msec. On the other hand, the vehicle speed and the yaw rate of the vehicle are detected substantially continuously by the wheel speed sensors $S_2$ and the yaw rate sensor $S_3$.

In addition to the electronically-controlled vacuum booster 2 and the hydraulic pressure control device 6, a warning device 9 comprising a buzzer, a chime, a speaker, a lamp or the like is connected to the collision possibility determining means M3 connected to the obstacle locus determining means M1 and the vehicle locus determining means M2. When the electronic control unit U determines, based on outputs from the radar device $S_1$, the wheel speed sensors $S_2$ and the yaw rate sensor $S_3$, that there is a possibility that the vehicle will collide against the obstacle O, the warning device 9 is operated to provide a warning to the driver, and at the same time, the electronically controlled vacuum booster 2 and the hydraulic pressure control device 6 are operated to automatically control the front wheels $W_{FL}$ and $W_{FR}$ and the rear wheels $W_{RL}$ and $W_{RR}$ in order to avoid the collision of the vehicle with the object.

If the operation of the pressure regulators 8 is controlled individually, based on the wheel speeds detected by the wheel speed sensors $S_2$, an antilock brake control for inhibiting the locking of the wheels during braking of the vehicle can be carried out.

The vehicle V, the obstacle O, the radar device $S_1$ and the wheel speed sensors $S_2$ in this embodiment constitute the moving body, the object, the object detecting means and the speed detecting means in the present invention, respectively.

Figure 4:
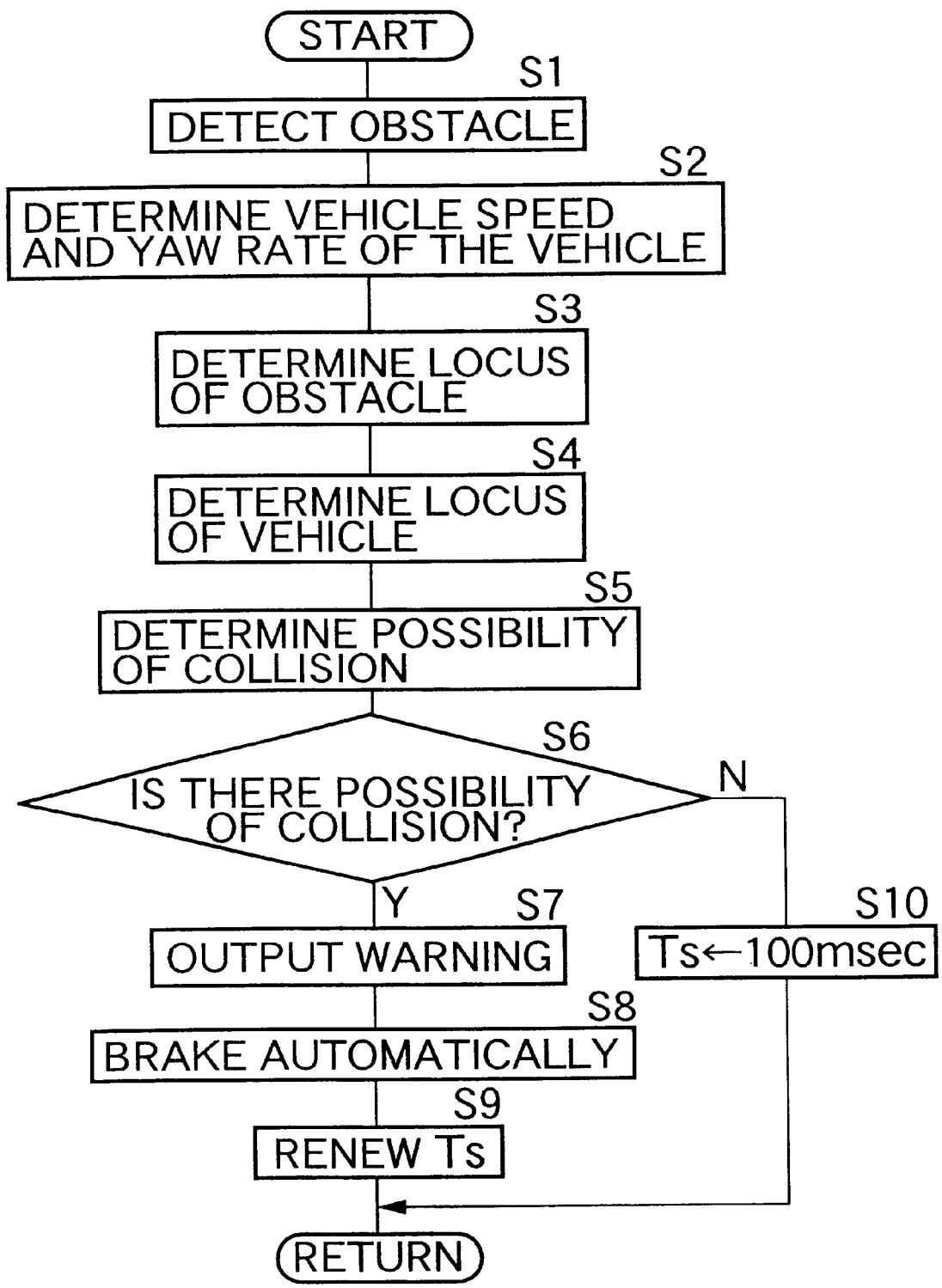

The operations of the obstacle locus determining means M1, the vehicle locus determining means M2 and the collision possibility determining means M3 will be described in further detail with reference to the flow chart in FIG. 4.

First, at Step S1, a relative position and a relative speed of an obstacle O such as a coming-on vehicle, relative to the vehicle are detected at a detection period of 100 msec by the radar device $S_1$, and at Step S2, the vehicle speed and the yaw rate of the vehicle are detected substantially continuously by the wheel speed sensors $S_2$ and the yaw rate sensor $S_3$, respectively.

At subsequent Step S3, the obstacle locus determining means M1 determines the locus of movement of the obstacle O, based on the relative position and the relative speed of the obstacle O detected by the radar device $S_1$. Namely, each of the relative position and the relative speed of the obstacle O detected by the radar device $S_1$, is comprised of a plurality of data provided at a time interval of 100 msec, as shown in FIG. 5, and by comparing the current value and the last value, a current acceleration and a current yaw rate of the obstacle can be calculated.

Therefore, on the basis of the current values of the relative position and the relative speed of the obstacle O and by taking the acceleration and the yaw rate into consideration in addition to the relative position and speed, it is possible to determine a relative position and a relative speed of the obstacle O after a predetermined time from the time point when the current data has been obtained. Namely, if the predetermined time is set at a determined period $T_S$ shorter than a detection period (100 msec) for the detection by the radar device $S_1$, the relative position and the relative speed of the obstacle O for a time of 100 msec from the time point when the current data has been obtained to a time point when the next data will be obtained, can be determined finely at every determination period $T_S$ shorter than 100 msec. The length of the determination period $T_S$ is determined at Step S9 which will be described hereinafter.

If the future relative position and speed of the obstacle O have been determined at every determination period $T_S$ in the above manner, a future locus of movement of the obstacle O can be determined at every determination period $T_S$, based on each of the determined relative positions and each of the determined relative speeds.

At subsequent Step S4, the locus of movement of the vehicle is determined based on the vehicle speed of the vehicle detected by the wheel speed sensors $S_3$ and the yaw rate of the vehicle detected by the yaw rate sensor $S_3$. More specifically, a future locus of movement of the vehicle can be determined by taking, in addition to the current vehicle speed of the vehicle, both of the acceleration provided by differentiating the current vehicle speed and the yaw rate into consideration. The determination period $T_S$ for the determination of the future locus of movement of the vehicle is set to be equal to the determination period $T_S$ for the determination of the above-described future locus of movement of the obstacle O.

At subsequent Step S5, it is determined at every determination period $T_S$ in the collision-possibility determining means M3, whether there is a possibility of collision of the vehicle with the obstacle O, by comparing the locus of movement of the obstacle O with the locus of movement of the vehicle. In this case, the determination of the locus of movement of the vehicle carried out at every determination period $T_S$ is conducted based on the vehicle speed and the yaw rate of the vehicle detected at a real time, but, based on which the locus of movement of the obstacle is determined, are renewed only at every 100 sec and hence, the relative position and the relative speed of the obstacle O determined at the determination period $T_S$ are used for 100 msec till the renewing of the relative speed and the relative speed of the obstacle O.

When it is determined by the collision-possibility determining means M3 at Step S6 that there is not the possibility of collision of the vehicle with the obstacle O, the determination period $T_S$ for the determination of the possibility of collision is maintained at 100 msec equal to the detection period for the detection by the radar device $S_1$ at Step S10. Thus, when there is not the possibility of collision of the vehicle with the obstacle O, the carrying-out of the determination of the possibility of collision at the determination period $T_S$ shorter than necessary is avoided, and the load of calculation in the electronic control unit U is alleviated.

On the other hand, when it is determined at Step S6 that there is the possibility of collision, the warning device 9 is operated to give a warning to a driver by a command from the electronic control unit U at Step S7, and further, the front wheels $W_{FL}$ and $W_{FR}$ and the rear wheels $W_{RL}$ and $W_{RR}$ are automatically braked at Step S8 without the need for the braking operation provided by the driver by operating the electronically-controlled vacuum booster 2 and the hydraulic pressure control device 6 by the command from the electronic control unit U, in order to avoid the collision of the vehicle with the obstacle O.

The possibility of collision of the vehicle and the obstacle O with each other is higher, as the distance d between them becomes shorter. Therefore, the determination period $T_S$ for the determination of the possibility of collision is renewed at Step S9 in order to ensure that the determination period $T_S$ for the possibility of collision, becomes shorter, as the distance d becomes shorter, thereby enhancing the determination accuracy. It should be noted that the distance d can be calculated based on the relative position of the obstacle O relative to the vehicle.

Figure 6:
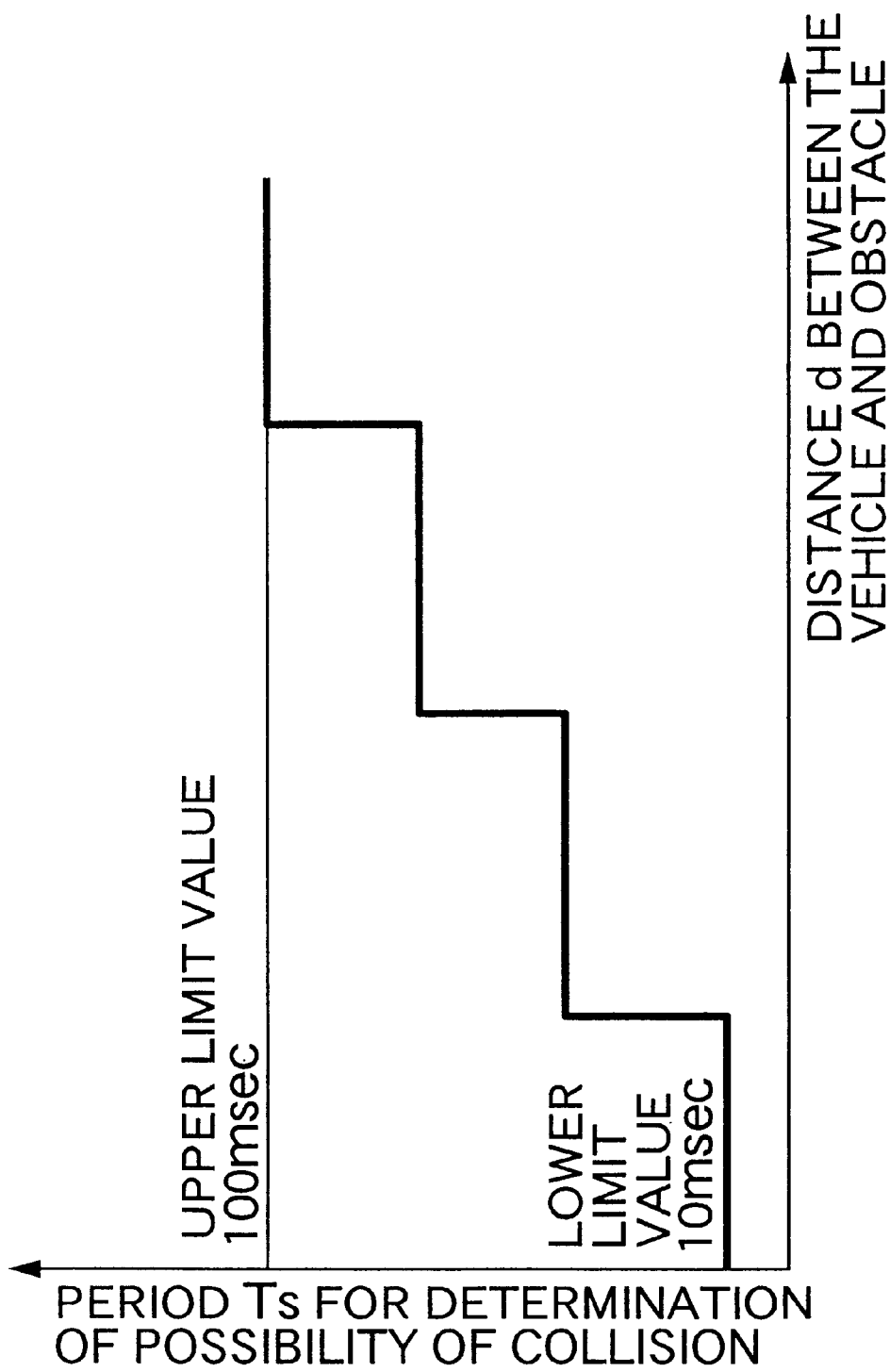

Various techniques are considered for the renewal of the determination period $T_S$. The technique shown in FIG. 6 is to decrease the determination period $T_S$ in accordance with the decrease in the distance d between the vehicle and the obstacle O in a multi-stage stepped manner from an upper limit value of 100 msec to a lower limit value of 10 msec. In FIG. 6, the axis of abscissas may be changed from the distance d between the vehicle and the obstacle O to the relative speed, so that as the relative speed becomes larger, namely, as the vehicle is rapidly coming closer to the obstacle O, the determination period $T_S$ may be decreased in a stepped manner.

In another technique, the determination period $T_S$ can be set using the distance d and constants $c_1$ and $c_2$, according to the following equation:

$$T_S = c_1 * d + c_2$$

If the determination period $T_S$ is set in the above manner, the determination period $T_S$ can be decreased continuously with the decrease in distance d. If the upper and lower limit values of the determination period $T_S$ are set, the characteristic of changing of the determination period $T_S$ is as shown in FIG. 7.

In a further technique, the determination period $T_S$ can be defined using the relative speed v between the vehicle and the obstacle O and constants $c_3$ and $c_4$ according to the following equation:

$$T_S = c_3 * v + c_4$$

Thus, the determination period $T_S$ can be decreased continuously with an increase in relative speed v. In this case, if the upper and lower limit values of the determination period $T_S$ are set, the characteristic of changing of the determination period $T_S$ is as shown in FIG. 7.

In a yet further technique, the determination period $T_S$ can be defined using the distance d, the relative speed v and constants $c_5$ and $c_6$ according to the following equation:

$$T_S = c_5 * (d/v) + c_6$$

If the determination period $T_S$ is set in the above manner, the determination period $T_S$ can be decreased with the increase in the relative speed v, as well as with the decrease in the distance d.

As described above, when there is the possibility of collision of the vehicle with the obstacle O, the determination period $T_S$ for the determination of the possibility of collision by the collision-possibility determining means M3 becomes shorter than 100 msec which is the detection period for the detection of the obstacle O by the radar device $S_1$. Therefore, the determination of the possibility of collision between the vehicle and the obstacle O can be carried out at a short determination period $T_S$ without use of an expensive, large-sized object detecting means requiring a short detection period. As a result, the accuracy of determination of the possibility of collision is enhanced, and an unnecessary warning and unnecessary automatic braking are prevented from being carried out to provide a sense of incompatibility to the driver.

The moving body in the present invention is not limited to the vehicle V of the embodiment and may be an airplane or a ship. The obstacle O is not limited to the on-coming vehicle in the present embodiment and may be a vehicle which is traveling ahead of the vehicle, or a stationary object placed on a road.

In addition, the lateral relative position of the obstacle O relative to the vehicle may be detected by the radar device $S_1$, and as the lateral relative position is closer to the vehicle, namely, as there is a higher possibility of collision, because the obstacle O is in front of the vehicle, the determination period $T_S$ may be decreased more.

The vehicle speed and the yaw rate of the vehicle have been used in the embodiment to presume the locus of movement of the vehicle, but the yaw rate is not necessarily required, and even if only the vehicle speed is used, a satisfactory accuracy can be ensured.

In addition, in the embodiment, the determination period $T_S$ is shortened to be smaller than the detection period for the detection of the obstacle O only when there is the possibility of collision of the vehicle against the obstacle O, but the determination period $T_S$ may always be shorter than the detection period for the detection of the obstacle O, irrespective of the presence or absence of the possibility of collision.

As discussed above, the determination period for determination of the possibility of collision by the collision-possibility determining means is set to be shorter than the detection period for detection of the object by the object detecting means. Therefore, it is possible to carry out the determination of the possibility of collision in the short determination period without the use of a large-size and expensive object detecting means having a short detection period, thereby enhancing the determination accuracy.

The change in relative position of the object relative to the moving body is detected in a period shorter than the detection period for detection of the object by the object detecting means, and hence, the collision-possibility determining means can determine the possibility of collision accurately, based on the change in relative position.

The determination period for the determination of the possibility of collision becomes shorter, as the distance between the moving body and the object becomes shorter. Therefore, when there is a high possibility of collision, the determination period can be shortened to enhance the determination accuracy.

The determination period for the determination of the possibility of collision by the collision-possibility determining means becomes shorter, as the relative speed between the moving body and the object becomes higher. Therefore, when there is a high possibility of collision, the determination period can be shortened to enhance the determination accuracy.

The determination period for the determination of the possibility of collision by the collision-possibility determining means becomes shorter, as the lateral relative position of the object becomes closer to the moving body. Therefore, when there is a high possibility of collision, the determination period can be shortened to enhance the determination accuracy.

Although the embodiment of the present invention has been described in detail, it will be understood that the present invention is not limited to the above-described embodiment, and various modifications may be made without departing from the matter of the invention.

What is claimed is:

1. An obstacle detecting system comprising:
    an object detecting means for detecting an object present in the direction of movement of a moving body;
    a speed detecting means for detecting the speed of movement of the moving body; and
    a collision-possibility determining means for determining the possibility of collision of the moving body with the object, based on the result of the detection by said object detecting means and the result of the detection by said speed detecting means;
    wherein a determination period is provided for determination of the possibility of collision by said collision-possibility determining means, the determination period being set to be shorter than a detection period for detection of the object by said object detecting means.

2. As obstacle detecting system according to claim 1, wherein said collision-possibility determining means detects a position of the object relative to the moving body based on the detection by said object detecting means and the detection by the speed detecting means to determine the possibility of collision based on a change in relative position, said relative position being detected at a period shorter than the detection period for the detection of the object by said object detecting means.

3. An obstacle detecting system according to claim 1 or 2, wherein the determination period for the determination of the possibility of collision by said collision-possibility determining means becomes shorter, as a distance between the moving body and the object becomes shorter.

4. An obstacle detecting system according to claim 1 or 2, wherein the determination period for the determination of the possibility of collision by said collision-possibility determining means becomes shorter, as the relative speed between the moving body and the object becomes higher.

5. An obstacle detecting system according to claim 1 or 2, wherein the determination period for the determination of the possibility of collision by said collision-possibility determining means becomes shorter, as the lateral relative position of the object becomes closer to the moving body.

* * * * *